United States Patent
Kanter et al.

(10) Patent No.: US 10,356,024 B2
(45) Date of Patent: *Jul. 16, 2019

(54) MODERATING CONTENT IN AN ONLINE FORUM

(71) Applicant: Facebook, Inc., Menlo Park, CA (US)

(72) Inventors: Jeffrey Andrew Kanter, San Francisco, CA (US); Mitu Singh, San Carlos, CA (US); Daniel Gregory Muriello, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 8 days.

This patent is subject to a terminal disclaimer.

(21) Appl. No.: 14/624,582

(22) Filed: Feb. 18, 2015

(65) Prior Publication Data

US 2015/0163184 A1 Jun. 11, 2015

Related U.S. Application Data

(63) Continuation of application No. 13/308,469, filed on Nov. 30, 2011, now Pat. No. 8,977,685.

(51) Int. Cl.
*G06F 15/16* (2006.01)
*H04L 12/58* (2006.01)
(Continued)

(52) U.S. Cl.
CPC ........... *H04L 51/12* (2013.01); *G06Q 10/101* (2013.01); *G06Q 50/01* (2013.01); *H04L 51/32* (2013.01); *H04L 67/10* (2013.01)

(58) Field of Classification Search
CPC .......... H04L 51/12; H04L 67/10; H04L 51/32; H04L 12/588; G06Q 50/01; G06Q 10/101
(Continued)

(56) References Cited

U.S. PATENT DOCUMENTS

2007/0106627 A1 * 5/2007 Srivastava ............. G06Q 10/10
706/20
2008/0104679 A1 * 5/2008 Craig ..................... H04L 67/306
726/4

(Continued)

OTHER PUBLICATIONS

United States Office Action, U.S. Appl. No. 13/308,469, dated Mar. 28, 2014, fourteen pages.

*Primary Examiner* — Suraj M Joshi
*Assistant Examiner* — Jaren Means
(74) *Attorney, Agent, or Firm* — Fenwick & West LLP

(57) ABSTRACT

Users of social networking system are provided with user interface elements permitting the user to post comments on pages within the social networking system. Pages may be provided for any non-user entity, including for example, pages for businesses, products, concepts, etc. Embodiments provided herein permit page moderators to ban certain content from being displayed on a page. For example, the social networking system may receive a list of proscribed content and block comments containing the proscribed content by reducing the distribution of those comments to other viewing users. However, the social networking system may display the blocked content to the commenting user such that the commenting user is not made aware that his or her comment was blocked, thereby providing fewer incentives to the commenting user to spam the page or attempt to circumvent the social networking system filters.

18 Claims, 3 Drawing Sheets

(51) Int. Cl.
*G06Q 50/00* (2012.01)
*G06Q 10/10* (2012.01)
*H04L 29/08* (2006.01)

(58) Field of Classification Search
USPC .......................................................... 709/204
See application file for complete search history.

(56) References Cited

U.S. PATENT DOCUMENTS

| | | | |
|---|---|---|---|
| 2010/0217721 A1* | 8/2010 | Wormald | G06Q 10/10 705/319 |
| 2011/0055332 A1* | 3/2011 | Stein | G06Q 10/107 709/206 |
| 2011/0113320 A1 | 5/2011 | Neff et al. | |
| 2011/0113349 A1* | 5/2011 | Kiciman | G06F 17/241 715/753 |
| 2011/0209192 A1* | 8/2011 | LeClerc Greer | G06F 21/32 726/1 |
| 2012/0158753 A1* | 6/2012 | He | H04L 63/1425 707/752 |
| 2012/0159635 A1* | 6/2012 | He et al. | G06Q 50/01 726/26 |
| 2012/0304072 A1* | 11/2012 | Mercuri | G06Q 10/00 715/745 |

* cited by examiner

MODERATING CONTENT IN AN ONLINE FORUM

CROSS REFERENCE TO RELATED APPLICATIONS

This application is a continuation of co-pending U.S. application Ser. No. 13/308,469, filed Nov. 30, 2011, which is incorporated by reference in its entirety.

BACKGROUND

This disclosure relates generally to sharing content within a social networking system and particularly to moderating content in an online forum within the social networking system.

Social networking systems often allow users to provide a comment or some user input to content displayed with the social networking system. For example, users can provide a comment on a photo, a wall posts, a profile post, etc. Additionally, social networking systems typically also permit users to generate pages or forums where users may view content posted on the forum page and provide additional comments. The forums may be about a topic, idea, business, product, etc or may be space for users to communicate with each other. Some forums however may be about sensitive topics or may be geared for particular users, and a page creator or moderator may want to block certain types of comments. For example, a moderator of a content page geared towards adolescents may want to block profane words from appearing on the page. In such an instance, the moderator may have to manually delete comments that include profanity. Additionally, a viewing user may have already been exposed to the profane comments before the moderator is able to delete the comments. Therefore, manually deleting certain comments may not provide an effective solution to moderating content in an online forum.

In some instances, a moderator may limit users who may post comments in an online forum. For example, the moderator may provide that only users belonging to certain social networks within the social networking system may comment on a forum. In such an instance, the moderator may be able to enforce content requirements with respect to comments by hoping that the permitted users will not violate the content requirements or by holding the user accountable outside the social networking system. Similarly, the moderator may also block offending users from commenting on the forum in the future. However, in such scenarios, the forum users may already have been exposed to banned content. Additionally, limiting the number or type of users may limit or inhibit different viewpoints in some forums that may benefit from diverse viewpoints. Therefore, a moderator often must choose between diversity of ideas or inappropriate comments from certain users when creating an online forum for users of a social networking system.

SUMMARY

Described embodiments enable a social networking system to block certain comments made by users in an online forum. An online forum may be characterized as a page on one or more topics wherein users may view content and provide comments. A forum creator or moderator may provide a request to block certain content from being displayed to forum users. Block requests may include, for example, a request to filter profane words, extremely negative, racist or derogatory comments, etc.

In one embodiment, the social networking system blocks banned comments by analyzing the text of the comments. For example, if a comment includes a profane word, as provided in list of banned words, the social networking system will not display the comment to other users of the social networking system. Additionally, in one embodiment the social networking system also performs a sentiment analysis to identify whether a comment includes sentiment that is banned by the moderator. Banned sentiments may include for example, racist, derogatory or negative comments. Additionally, the social networking system may train a machine learning classifier to block comments based on moderator actions of manually deleting comments or unblocking comments in the online forum.

In one embodiment, the blocked comments are not displayed to the forum users. However, the blocked comment may be displayed to the commenting user and his or her friends within the social networking system. As such, the offending user may not be aware that his or her comment is not displayed to other users of the forum. In other instances, should a user be deemed a repeat offender, the forum display may not include the comment input text box to prevent the user from trying to spam the forum. As such, the social networking system may provide an online forum experience that is deemed appropriate by the forum creator or moderator.

The features and advantages described in this summary and the following detailed description are not all-inclusive. Many additional features and advantages will be apparent to one of ordinary skill in the art in view of the drawings, specification, and claims thereof.

Figure 1:
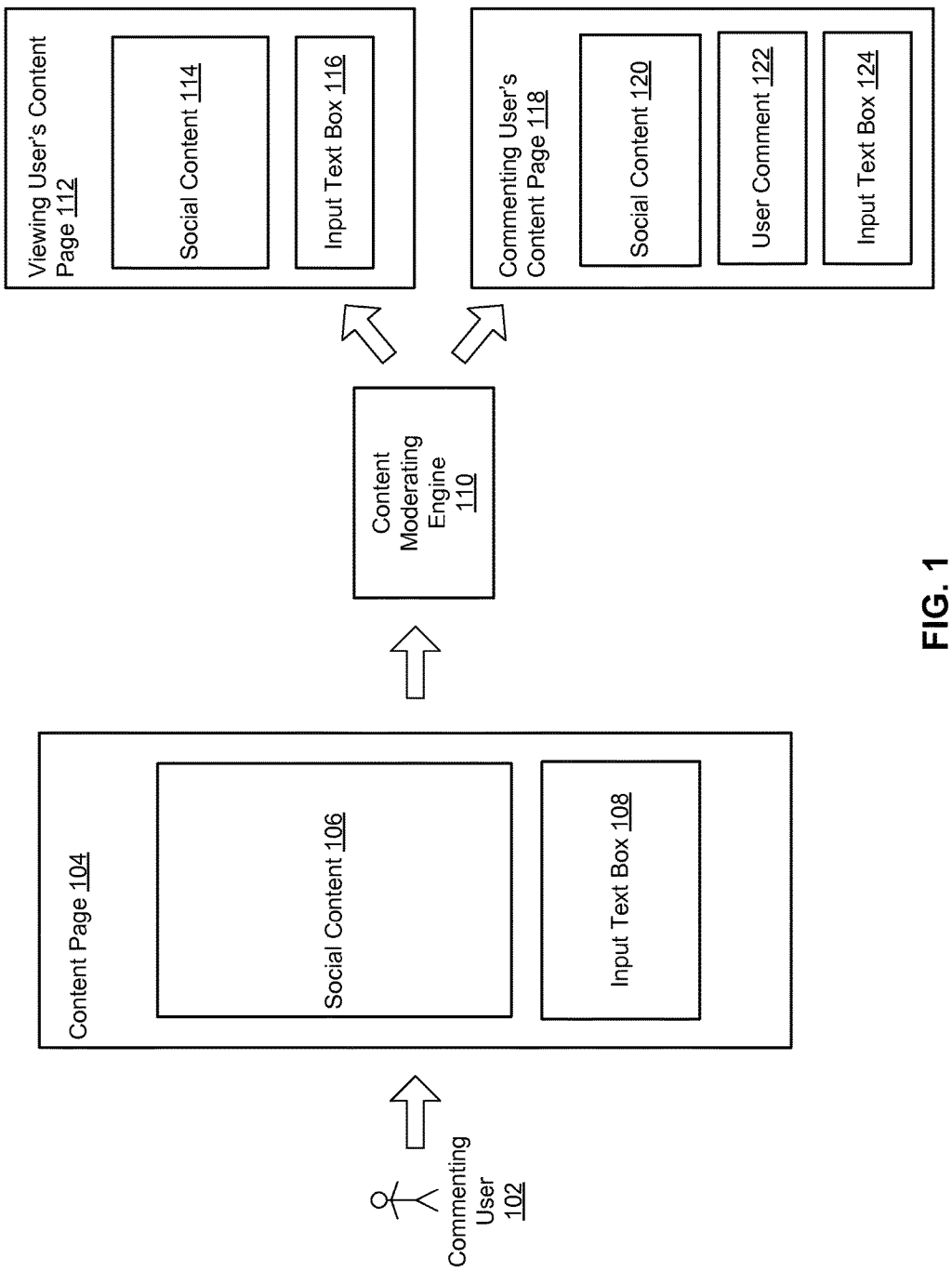
FIG. 1 illustrates a system for moderating comments in an online forum, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system includes users connected to each other and non-user entities such as businesses, products, bands, songs, games, etc. Users of the social networking system typically have profile pages wherein users may post comments, photos and otherwise communicate with each other. Similarly, the non-user entities may have a page that users can like and post comments, pictures/videos associated with the non-user entity. Users can also create pages for an organization, a concept, an event etc., wherein users can communicate with each other by posting comments and such on the page. These pages provide an online forum for one or more topics associated with the page. Embodiments of the invention permit forum moderators to provide words or sentiments that should not be displayed to users viewing the forum because they may be inappropriate in light of the topic or in light of the intended audience. As such, the social networking system does not display the banned content to users viewing the forum page within the social networking system.

Figure (FIG.) 1 illustrates a system for moderating comments in an online forum, in accordance with an embodiment of the invention. In one embodiment, the system includes a commenting user 102, a content page 104 including social content 106 and an input text box 108, a content moderating engine 110, a viewing user's content page 112 including social content 114 and an input text box 116 and a commenting user's social networking system display 118 includes social content 120, user comment 122 and an input text box 124.

In one embodiment, a content page 104 is provided to a commenting user 102 responsive to a request by the commenting user 102. The content page 104 may be created by a user of the social networking system to highlight or discuss a non-user entity within the social networking system. A non-user entity may be an idea, an activity, a community, an organization, a business, a product etc. The content page includes social content 106 comprising comments, photos or videos or other media shared within the content page 104 by entities within the social networking system. In one embodiment, the content page 104 also includes an input text box 108 that receives a user input. A user may provide a comment to add to the content displayed within the content page 104.

In one embodiment, a commenting user 102 inputs his or her comments in the input text box 108 of the content page to share the comment with users viewing the content page 104. The comment is received by the social networking system and displayed on the content page if the content moderating engine 110 deems that the comment meets requirements provided by the page moderator. A content moderator may provide that use of certain words, such as profanity is prohibited on a content page 104. Additionally, the moderator may provide that use of certain sentiments such as aggressive negativity is also prohibited on the content page 104. The content moderating engine 110 reviews comments to determine if the commenting user's comment includes any of the prohibited words or sentiments. If prohibited content is present in the user's comments, the comment may be blocked by the content moderating engine 110, such that it is not displayed to other users viewing the content page.

If the content of a user comment is prohibited, a viewing user's content page 112 excludes the comment. Thus, a prohibited content is not displayed to the user. In one embodiment, the social networking system may provide a message notifying a user that a comment was removed because it was deemed inappropriate for the content page 104. With the exception of the removed comment, the user's content page 112 may include other content associated with the content page 104, including social content 114 and an input text box 116. Alternatively, the prohibited content may be displayed on the commenting user's content page 118 along with other social content 120 and an input text box 124. Therefore, the commenting user 102 is not made aware that his or her comment was not displayed to other users viewing the content page 104. If a user does not know that his or her comment was blocked, the user may be less likely to repeatedly post or repost—that is, spam—the content page 104 or attempt to circumvent the content moderating engine's 110 filtering capabilities.

System Architecture

Figure 2:
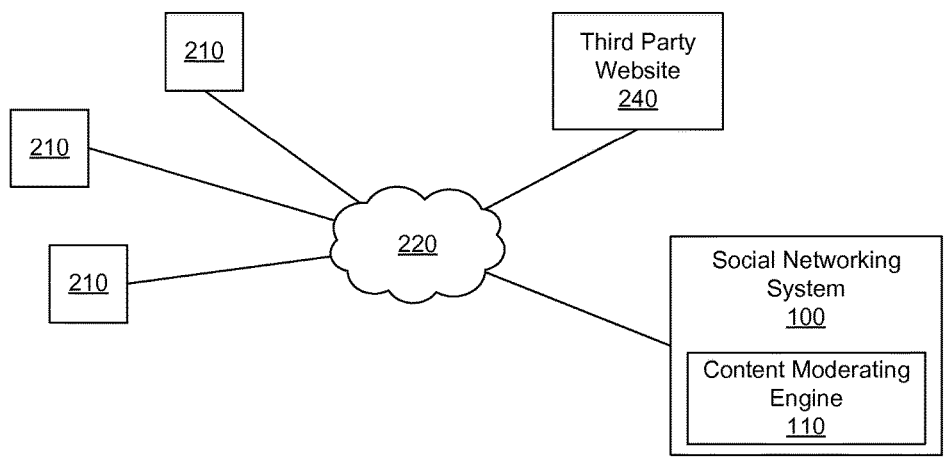
FIG. 2 is a network diagram including a social networking system for moderating comments in an online forum, in accordance with an embodiment of the invention.

FIG. 2 is a block diagram illustrating a system environment suitable for operation of a social networking system 100. The system environment comprises one or more client devices 210, one or more third-party websites 240, a social networking system 100 comprising a content moderating engine 110 and a network 220. In alternative configurations, different and/or additional modules can be included in the system.

The client devices 210 comprise one or more computing devices that can receive user input and can transmit and receive data via the network 220. For example, the client devices 210 may be desktop computers, laptop computers, tablet computers (pads), smart phones, personal digital assistants (PDAs), or any other device including computing functionality and data communication capabilities. The client devices 220 are configured to communicate via network 220, which may comprise any combination of local area and/or wide area networks, using both wired and wireless communication systems.

Figure 3:
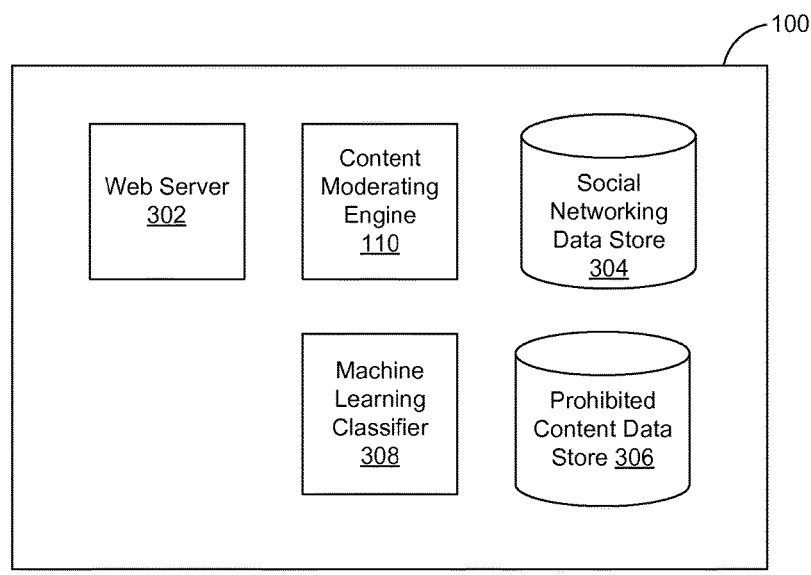
FIG. 3 is a block diagram of a social networking system for moderating comments in an online forum, in accordance with an embodiment of the invention.

FIG. 3 is a block diagram of a social networking system for moderating comments in an online forum, in accordance with an embodiment of the invention. The social networking system 100 includes a web server 302, a social networking data store 304, a prohibited content data store 306, a machine learning classifier 308, a content moderating engine 110 and a publishing engine 310. In other embodiments, the social networking system 100 may include additional, fewer, or different modules for various applications.

The web server 302 links the social networking system 100 via the network 220 to one or more client devices 210, as well as to one or more third party websites 140. The web server 302 may include a mail server or other messaging functionality for receiving and routing messages between the social networking system 100 and the client devices 210 or third party websites 140. The messages can be instant messages, queued messages (e.g., email), text and SMS messages, or any other suitable messaging technique. Additionally, the web server 302 links the social networking system 100 to client devices 210 wherein the client devices can be used to log into the social networking system by using an application executing on the mobile device 210 or by using a web browser executing on the mobile device 210.

The social networking data store 302 includes social networking system information that is tracked and maintained by a social networking system. In one embodiment, the social networking system data is stored as a social graph within the social networking system data store 302. The social graph includes a plurality of nodes that are interconnected by a plurality of edges (representing interactions, connections, communications or other measures of relatedness between nodes). A social graph node may represent a social networking system object that can act on and/or be acted upon by another node. An edge between nodes in a social graph represents any kind of connection or interaction between the two nodes, which may result from an action that was performed by one of the nodes on the other node. In this description, reference to an edge connecting two objects in a social graph is intended to refer to an edge connecting the nodes representing each of the two objects. In one embodiment, the social graph is used by the collection engine and the analysis engine to display tips to a viewing user within the social networking system. In one embodiment, a non-user entity page may be stored as a node within the social graph. As described in the specification, a non-user entity page may be a page about a business, a product, a band, a song, etc.

The prohibited content data store 306 stores words or phrases to ban on a page within the social networking system. The prohibited content data store 306, for example, may include profane or offensive words in languages supported by the social networking system. Additionally, the prohibited content data store 306 may classify the words or phrases as being, for example, sexual in nature, violent in nature, etc. In one embodiment, a content moderator provides a listing of words that are prohibited within a page on the social networking system. In other embodiments, the content moderator provides categories of words and phrases that are prohibited or express certain sentiments such as extreme negativity or anger, etc. In one embodiment, the proscribed words are stored in a trie data structure wherein keys are strings and form a proscribed word.

The content moderating engine 110 moderates content proscribed by the content moderator by identifying proscribed content and blocking the proscribed content from being displayed to users of the social networking system. In one embodiment, the content moderating engine 110 identifies proscribed text by matching the text in a user comment to the text stored in the prohibited content data store 306. Any number of matching techniques may be used to identify whether text in a user comment is proscribed by a page moderator. In an embodiment wherein the proscribed words are stored in a trie data structure, the content moderating engine 110 searches each word or search starting at each character in a string of proscribed words in the trie data structure. Therefore, the content moderating engine 110 efficiently searches for proscribed content on a page within the social networking system. In other embodiments, the content moderating engine 110 also performs sentiment analysis to identify tone or sentiment that may be proscribed by a content moderator. For example, the content moderating engine 110 may identify proscribed sentiment or phrase by searching for the words in the prohibited content data store 306 wherein words may form a string in a trie database. As such, the content moderating engine 110 may identify proscribed words, sentiment or tones in comments posted by users on a page within the social networking system.

In one embodiment, the content moderating engine 110 does not display comments containing proscribed content on the page to other users of the social networking system. For example, if a user posts a comment containing proscribed content, the content moderating engine 110 reduces the distribution of the comment to other users of the social networking system by not displaying the comment to other the other users. In one embodiment, the content moderating engine 110 does not provide any text notifying a user that a comment was deleted because of its content. Thus, other users would not know that a comment containing proscribed content was posted on the social networking system page. However, the content moderating engine 110 may display the post to the commenting user and his or her friends. As such, the commenting user and his or her friends may not know that his or her comment is blocked and not displayed to other users of the social networking system. This method of distributing comments provided by users permits a social networking system to distribute comments to users as deemed appropriate based on content that is already available in a forum. In addition, this method does not discourage users from posting content within the social networking system. Instead, it may encourage users to create another forum wherein the comment is distributed more widely based on the content of the new forum. As such, the social networking system is enabled to encourage users to create new forums to share their views rather than commenting in a forum wherein certain comments may be deemed inappropriate.

In one embodiment, all comments made on a page may be visible to the page moderator. As such, the page moderator may unblock comments that the moderator finds inoffensive or improperly blocked. In one instance, the social networking system compiles a list of content blocked for a particular page. The list, including the blocked content may be sent to the page moderator, wherein the page moderator may review the comments. The list may also include user interface elements allowing the moderator to unblock or make comments visible to other users. Additionally, the moderator may block or reduce the distribution of comments that were allowed by the content moderating engine 110. Similarly, others users of the social networking system may flag comments as being offensive or inappropriate. The machine learning classifier 308 may use the make-visible and flag data to generate a machine learning algorithm to better block or make visible user comments based on parameters providing content that is proscribed. For example, comments that are subsequently blocked or made visible may be used as a training data for the classifier. In such an instance the machine learning classifier 308 uses the training data to generate an algorithm providing a likelihood that a comment may comprise proscribed content. The generated algorithm may be used by the content moderating engine 110 to identify comments that contain proscribed content.

Method of Moderating Comments in an Online Forum

Figure 4:
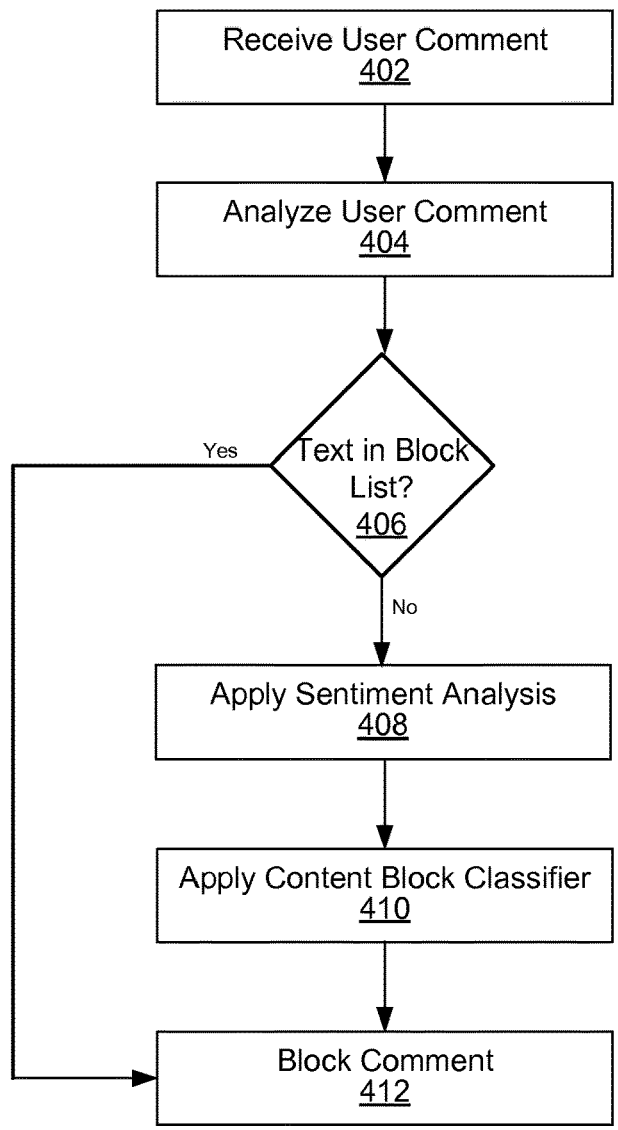
FIG. 4 is a flowchart of a process for moderating comments in an online forum, in accordance with an embodiment of the invention.

FIG. 4 is a flowchart of a process for moderating comments in an online forum, in accordance with one embodiment. The social networking system receives 402 a user comment. The received 402 comment may be posted by the user on a page or on an image/video on a page within the social networking system. The content of the comment 402 is stored within the social networking system for display to a viewing user.

The social networking system matches 404 the content of the user comment to determine if the words or phrases provided in the comment are proscribed. In one embodiment, proscribed words or phrases are stored in a block list. Therefore, the social networking system may match each word or phrase in the comment to the words or phrases provided in the block list. One or more matching techniques may be used to perform such a match. For example, if the block list provides proscribed words or phrases in tie data structure, the social networking system may attempt to match 404 each word in a comment, each character in a word or each word in a phrase in order to match comment content with the block list content.

If the comment's content matches the block list content 406, the social networking system blocks 412 the comment and notifies the page moderator about the blocked comment. For example, the social networking system may block the comment by making the comment invisible or reducing the distribution of the comment to other users of the social networking system such that the other users do not know that a comment was blocked. If however, the comment's content does not match the block list content 406, the social networking system applies 408 sentiment analysis to the content to determine if the content expresses a proscribed sentiment or a tone. A proscribed sentiment or tone may be identified by matching phrases in the comment with phrases provided in the block list database as described above with reference to proscribed words or phrases. If the comment expresses a proscribed sentiment or tone, it is blocked and the page moderator is notified.

In one embodiment, the social networking system generates a machine-learned algorithm to calculate a probability that a comment contains proscribed words or phrases based on actions of users on the social networking system. In one embodiment, users may flag a comment as inappropriate or insensitive. For example, the social networking system provides user interface elements that allow users to block each comment displayed on a page. The user interface elements may be provided in reference to each comment. In such an instance, the user input may be used as historic data to build a machine learning classifier. Additionally, a page moderator may provide feedback when a comment is improperly blocked. In such an instance, the moderator actions are used as historic data for the classifier. The machine-learned algorithm is applied 410 by the social networking system to identify a probability that a comment is likely to contain content proscribed by a page administrator. If the probability is higher than a predetermined threshold, the comment is blocked 412 by the social networking system.

In one embodiment, the social networking system blocks 412 a comment by not displaying the comment to other users of the social networking system. For example, the proscribed comment may not be distributed to some of the other users of the social networking system such that they are unable to view the comment. Additionally, the proscribed comment may be displayed to the commenting user such that the commenting user is not made aware that the proscribed comment is not distributed to some of the other users of the social networking system.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving a comment from a posting user of a social networking system, the comment posted on a page within the social networking system;
   determining, by a processor, that the comment includes proscribed content; and
   responsive to the determination:
      identifying users of the social networking system who are connected to the posting user in the social networking system with a specified connection type, wherein the specified connection type is a one-to-one friend connection;
      determining, by the processor, a social networking system audience for the comment without input from the posting user, the processor determining the social networking system audience before providing the comment for display; and
   displaying the comment to the audience by:
      formatting the page including the comment to the posting user, and formatting the page not including the comment to users of the social networking system accessing the page who are not connected to the posting user with the specified connection type.

2. The method of claim 1, wherein the processor determines that the proscribed content is at least one of profanity, offensive content, insensitive content, derogatory content, and racial slurs.

3. The method of claim 1, wherein the proscribed content is stored as a trie data structure wherein each letter of a proscribed word is a key.

4. The method of claim 3, wherein determining, by a processor, that the comment includes proscribed content further comprises searching each word in a trie database and starting a search for proscribed content at each character.

5. The method of claim 1, further comprising:
   receiving an input from a page moderator of the page including instructions to display a second comment on the page;

receiving an input from another user indicating instructions to remove the second comment displayed on the page; and generating a classifier to determine a probability of the second comment including proscribed content based on input received from the page moderator and the another user.

6. The method of claim 5, further comprising applying the generated classifier to a third comment to determine a probability of the third comment being marked to display on the page by the page moderator.

7. The method of claim 6, further comprising displaying the third comment if its probability of being displayed as computed by applying the generated classifier is higher than a threshold.

8. The method of claim 5, wherein the page moderator is a social networking system entity creating the page.

9. The method of claim 5, wherein the classifier is a machine learning algorithm that calculates a probability that a comment contains proscribed content.

10. The method of claim 1, further comprising providing a notification to the posting user that the comment is hidden from the users not connected to the posting user with the specified connection type.

11. The method of claim 1, further comprising:
determining that the posting user has previously posted one or more comments containing proscribed content on a page within the social networking system; and
removing, on the page displayed to the posting user, user interface elements enabling the posting user to comment on the page.

12. The method of claim 1, wherein the page comprises a social networking system page about at least one of a business, an idea, a concept, a product, a song, and an album.

13. The method of claim 1, wherein the proscribed content is in a block list.

14. A method comprising:
receiving a comment from a posting user of a social networking system, the comment posted on a page within the social networking system;
automatically determining, by the social networking system, that the comment contains proscribed content; and
responsive to the determination:
receiving a request to view the page from a requesting user;
determining, by the social networking system, a social networking system audience for the comment without input from the posting user, the social networking system determining the social networking system audience before providing the comment for display; and
displaying the comment to the audience by:
determining whether the requesting user is the posting user that posted the comment;
responsive to determining that the requesting user is the posting user, formatting the page with the comment;
responsive to determining that the requesting user is not the posting user, determining whether the requesting user is connected to the posting user in the social networking system with a specified connection type, wherein the specified connection type is a one-to-one friend connection;
responsive to determining that the requesting user is connected to the posting user with the specified connection type, formatting the page with the comment; and
responsive to determining that the requesting user is not connected to the posting user with the specified connection type, formatting the page without the comment.

15. The method of claim 14, wherein the social networking system determines that the proscribed content is at least one of profanity, offensive content, insensitive content, derogatory content, and racial slurs.

16. The method of claim 14, wherein the proscribed content is in a block list.

17. A non-transitory computer-readable storage medium having instructions encoded thereon that, when executed by a processor, cause the processor to:
receive a comment from a user of a social networking system, the comment posted on a page within the social networking system;
determine, by a processor, that the comment includes proscribed content; and
responsive to the determination,
identify users of the social networking system who are connected to the posting user in the social networking system with a specified connection type, wherein the specified connection type is a one-to-one friend connection;
determine, by the processor, a social networking system audience for the comment without input from the posting user, the processor determining the social networking system audience before providing the comment for display; and
display the comment to the audience by:
formatting the page including the comment to the posting user,
and formatting the page not including the comment to users of the social networking system accessing the page who are not connected to the posting user with the specified connection type.

18. A non-transitory computer-readable storage medium having instructions encoded thereon that, when executed by a processor, cause the processor to:
receive a comment from a posting user of a social networking system, the comment posted on a page within the social networking;
automatically determine, by the social networking system, that the comment contains proscribed content; and
responsive to the determination:
receive a request to view the page from a requesting user;
determine, by the social networking system, a social networking system audience for the comment without input from the posting user, the social networking system determining the social networking system audience before providing the comment for display; and
display the comment to the audience by:
determining whether the requesting user is the posting user that posted the comment;
responsive to determining that the requesting user is the posting user, formatting the page with the comment;
responsive to determining that the requesting user is not the posting user, determining whether the requesting user is connected to the posting user in the social networking system with a specified connection type, wherein the specified connection type is a one-to-one friend connection;

responsive to determining that the requesting user is connected to the posting user with the specified connection type, formatting the page with the comment; and responsive to determining that the requesting user is not connected to the posting user with the specified connection type, formatting the page without the comment.

* * * * *